(12) United States Patent
Chiou et al.

(10) Patent No.: US 7,083,019 B2
(45) Date of Patent: Aug. 1, 2006

(54) ELECTRICAL WHEELCHAIR WITH AN ELECTRICAL SEAT-ROTATING DEVICE

(75) Inventors: Shean-Juinn Chiou, Taichung (TW); Jau-Liang Chen, Taichung (TW); Jong-Fang Ho, Taichung (TW)

(73) Assignees: National Chung-Hsing University, Taichung (TW); Chung Shan Medical University, Taichung (TW)

( * ) Notice: Subject to any disclaimer, the term of this patent is extended or adjusted under 35 U.S.C. 154(b) by 261 days.

(21) Appl. No.: 10/847,873

(22) Filed: May 19, 2004

(65) Prior Publication Data

US 2005/0279539 A1 Dec. 22, 2005

(30) Foreign Application Priority Data

Sep. 10, 2003 (TW) .............................. 92216328 U

(51) Int. Cl.
 *B60K 1/00* (2006.01)
(52) U.S. Cl. ...................... 180/65.1; 180/330; 180/907
(58) Field of Classification Search ............... 180/65.1, 180/907, 908, 326, 330; 280/47.34, 47.38, 280/47.39, 47.4, 47.41; 297/217.3
See application file for complete search history.

(56) References Cited

U.S. PATENT DOCUMENTS

| 3,964,713 | A | * | 6/1976 | Joslyn et al. | ................ | 248/418 |
| 4,951,766 | A | * | 8/1990 | Basedow et al. | ............ | 180/6.5 |
| 5,732,788 | A | * | 3/1998 | Brown | ........................ | 180/326 |
| 6,290,011 | B1 | * | 9/2001 | Langaker et al. | ........... | 180/65.1 |
| 6,684,969 | B1 | * | 2/2004 | Flowers et al. | ............. | 180/65.1 |
| 6,702,049 | B1 | * | 3/2004 | Cheng | .......................... | 180/6.6 |
| 6,938,923 | B1 | * | 9/2005 | Mulhern et al. | ............. | 280/755 |

* cited by examiner

*Primary Examiner*—Christopher P. Ellis
*Assistant Examiner*—Brian Swenson
(74) *Attorney, Agent, or Firm*—Foley & Lardner LLP

(57) ABSTRACT

An electrical wheelchair includes a vertical rotating shaft connected fixedly to a seat member and journalled on a frame of a chair body, and a worm unit for transferring rotation of a motor shaft to the rotating shaft. A wheel-controlling switch is disposed on the seat member, and is operable to rotate a driving wheel unit. A rotation-controlling switch is also disposed on the seat member, and is operable to rotate the rotating shaft and the seat member by any desired angle smaller than and equal to 360°. When the seat member rotates from a frontward position by 180°, the rotational direction of the driving wheel unit is reversed under automatic control. As such, forward and rearward movement of the wheelchair can be conducted with ease.

4 Claims, 5 Drawing Sheets

ELECTRICAL WHEELCHAIR WITH AN ELECTRICAL SEAT-ROTATING DEVICE

CROSS-REFERENCE TO RELATED APPLICATION

This application claims priority of Taiwanese Application No. 092216328, filed on Sep. 10, 2003.

BACKGROUND OF THE INVENTION

1. Field of the Invention

This invention relates to an electrical wheelchair with a seat-rotating device, and more particularly to an electrical wheelchair with an electrical seat-rotating device.

2. Description of the Related Art

A manually operated seat-rotating device has been used on an electrical wheelchair. However, it is difficult for a disabled user to perform the manual seat-rotating operation.

SUMMARY OF THE INVENTION

The object of this invention is to provide an electrical wheelchair that includes an electrical seat-rotating device which can be operated with ease.

According to this invention, an electrical wheelchair includes a vertical rotating shaft connected fixedly to a seat member and journalled on a frame of a chair body, and a worm unit for transferring rotation of a motor shaft to the rotating shaft. A wheel-controlling switch is disposed on the seat member, and is operable to rotate a driving wheel unit. A rotation-controlling switch is also disposed on the seat member, and is operable to rotate the rotating shaft and the seat member by any desired angle smaller than or equal to 360°. When the seat member rotates from a frontward position by 180°, the rotational direction of the driving wheel unit is reversed under automatic control. As such, forward and rearward movement of the wheelchair can be conducted with ease.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
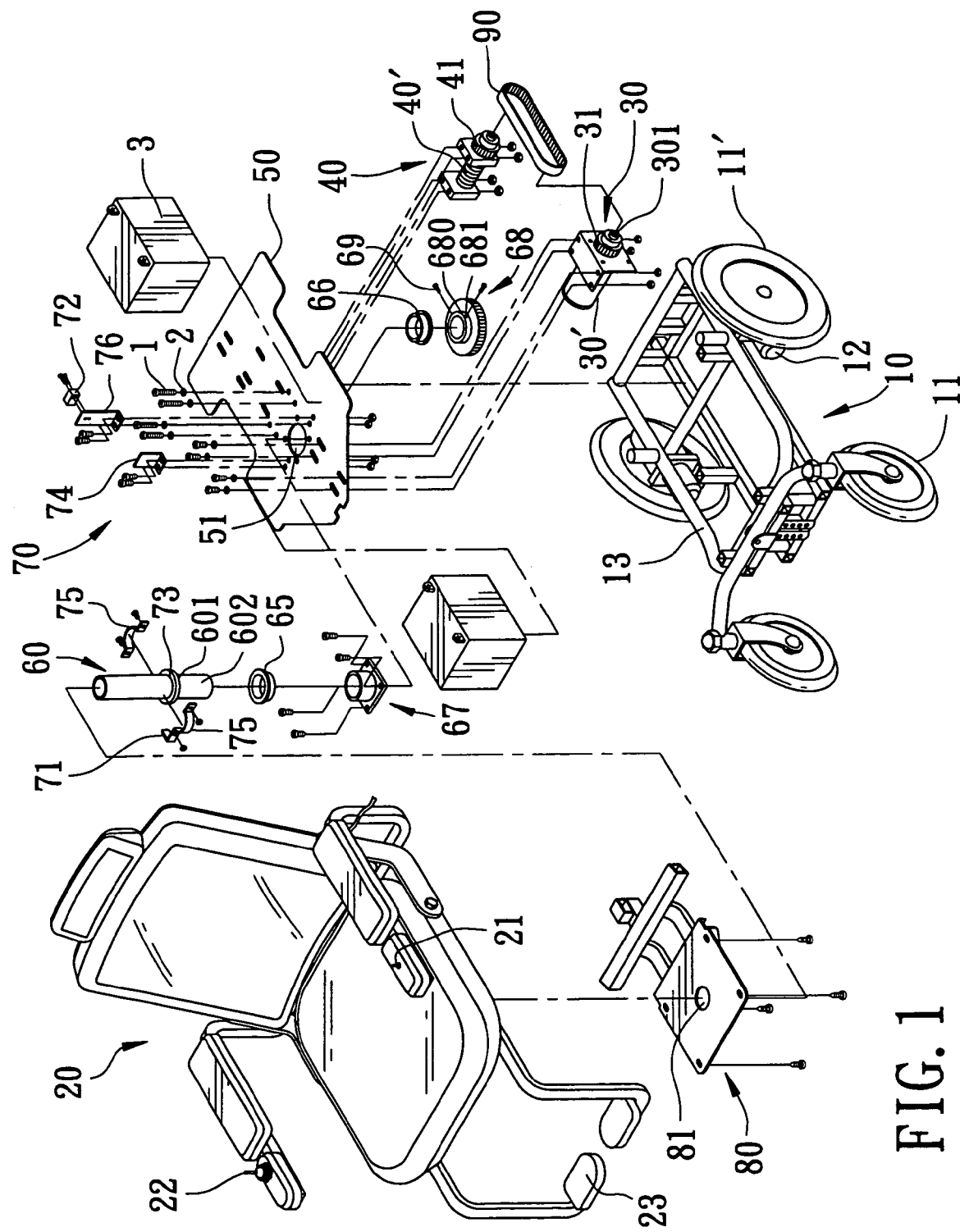
FIG. 1 is a partly exploded perspective view of the preferred embodiment of an electrical wheelchair according to this invention, a plurality of electrical wires being removed for the sake of brevity.
Figure 2:
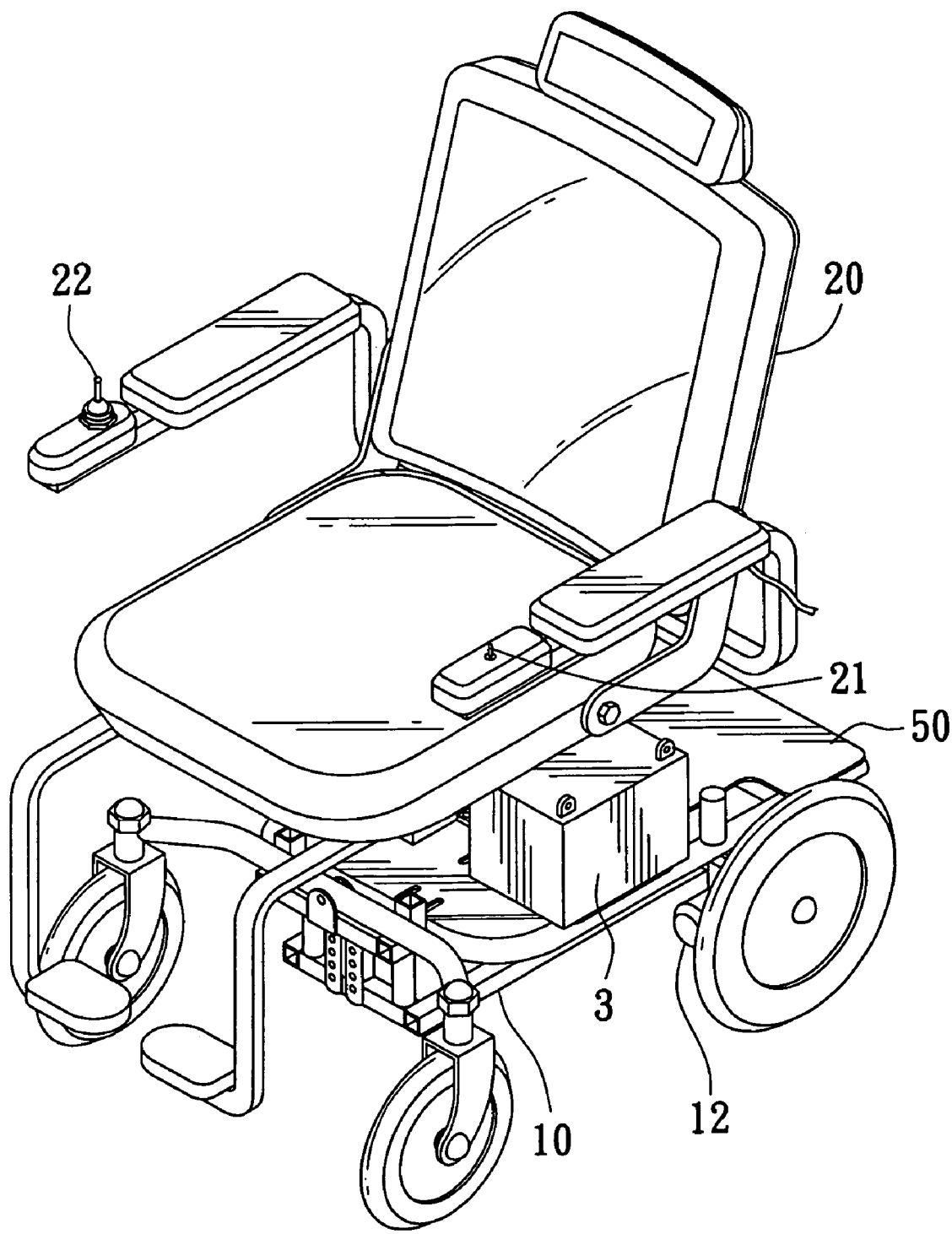
FIG. 2 is an assembled perspective view of the preferred embodiment.
Figure 3:
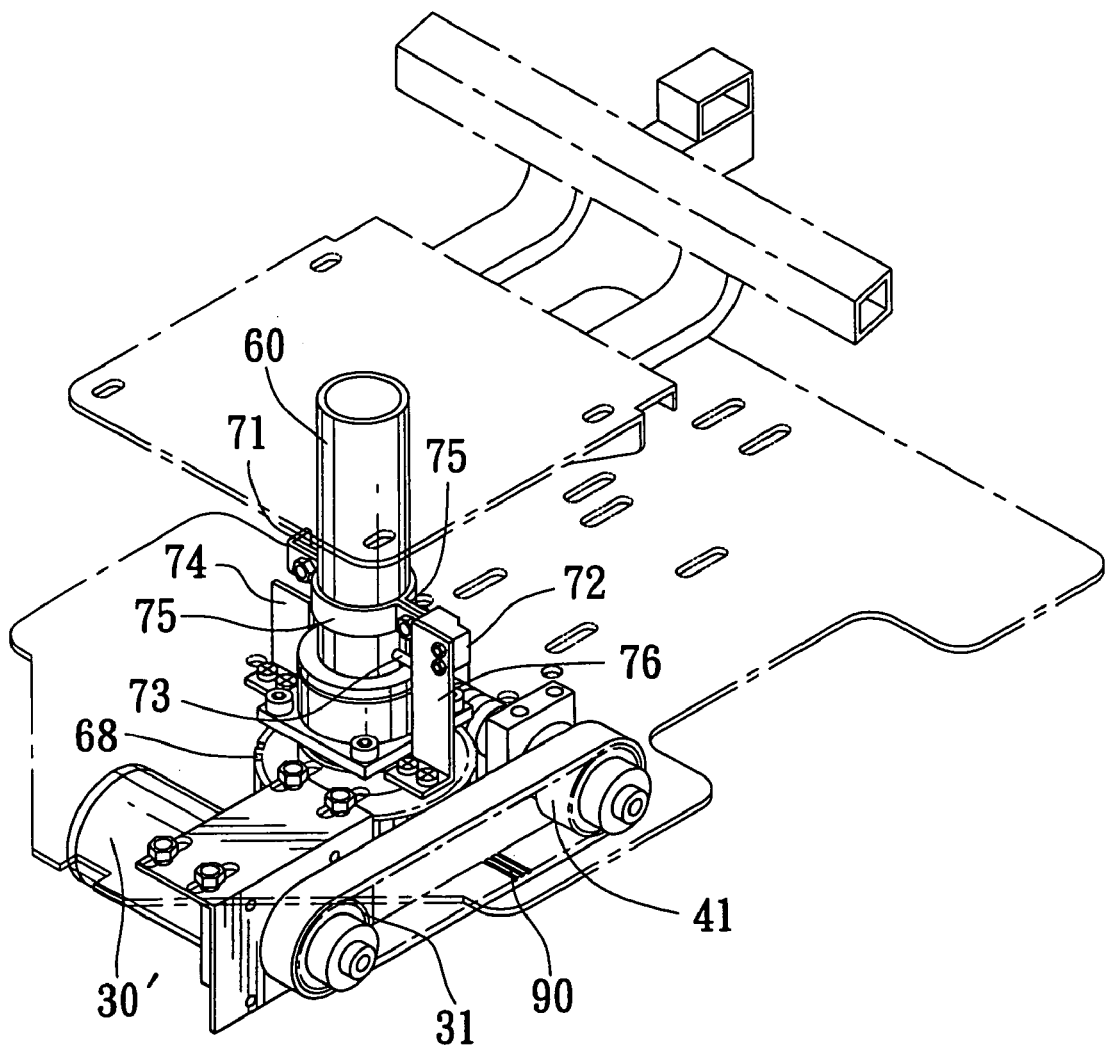
FIG. 3 is a fragmentary assembled perspective view of the preferred embodiment.

Referring to FIGS. 1, 2, and 3, the preferred embodiment of an electrical wheelchair according to this invention is shown to include a chair body 10, a seat member 20, a motor unit 30, a worm unit 40, a horizontal mounting plate 50, a vertical rotating shaft 60, a control unit 70, a seat-supporting plate 80, an endless timing belt 90, a plurality of bolts 1, a plurality of nuts 2, and two battery cases 3.

The chair body 10 includes two front wheels 11 and a driving wheel unit consisting of two rear driving wheels 11'. The front wheels 11 and the rear driving wheels 11' are disposed rotatably on a frame 13.

Figure 4:
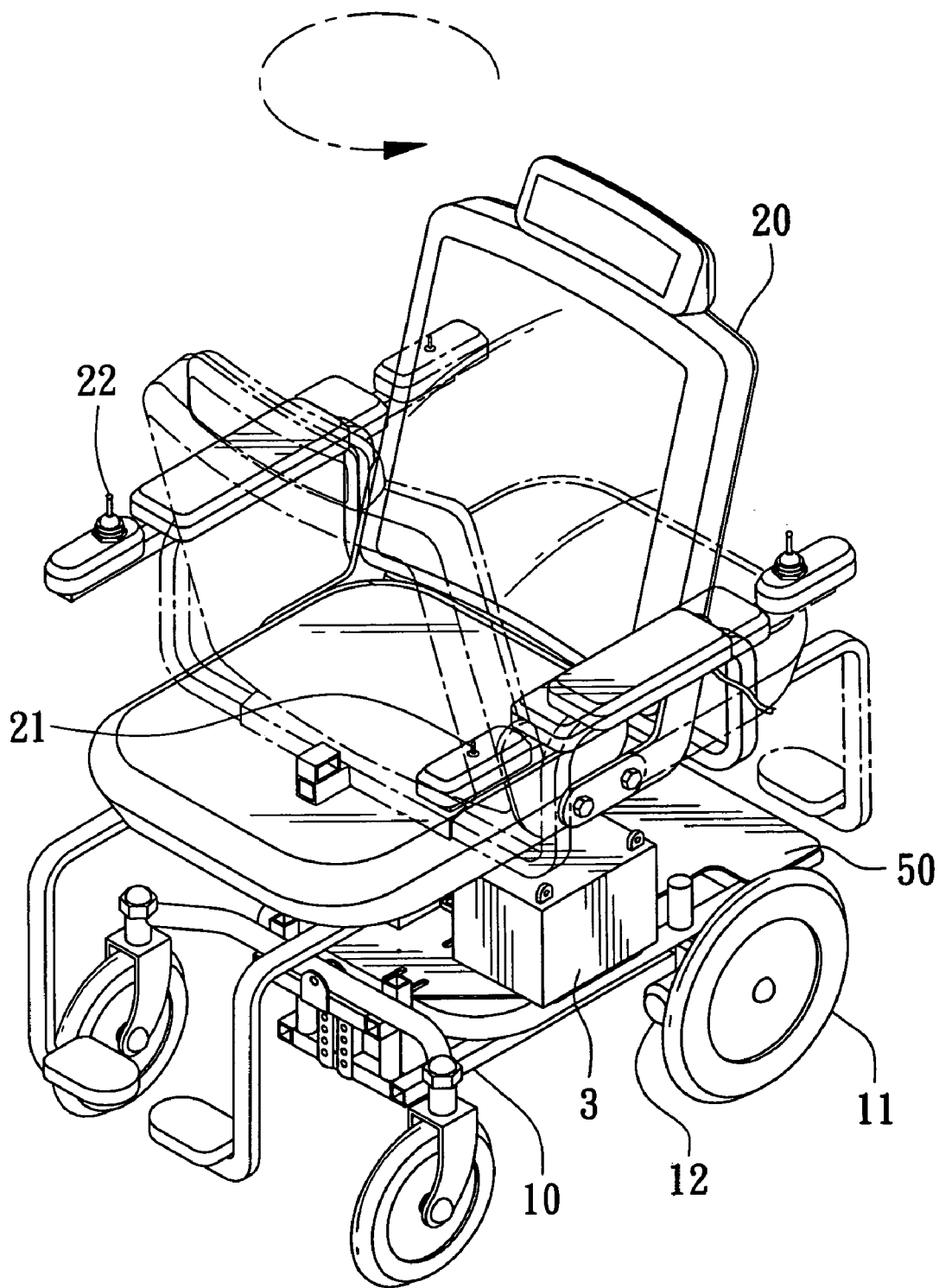
FIG. 4 is a schematic assembled perspective view of the preferred embodiment, illustrating how a seat member is rotated by 180°.

The seat member 20 is disposed above the frame 13, and includes a rotation-controlling switch 21 disposed on a left armrest of the seat member 20 and configured as a spring-loaded pushbutton, a wheel-controlling switch 22 disposed on a right armrest of the seat member 20 and configured as a swing lever, and a pair of fixed footrests 23. Normally, the seat member 20 is disposed at a frontward position relative to the frame 13, as shown by solid lines in FIG. 4.

The seat-supporting plate 80 is connected threadedly to the seat member 20. The rotating shaft 60 has an upper end extending through a hole 81 in the seat-supporting plate 80 and welded to the seat-supporting plate 80.

A motor unit 30 is connected electrically to the rotation-controlling switch 21 and the wheel-controlling switch 22, and includes a driving motor 30' that is connected electrically to the rotation-controlling switch 21 and that is provided with a motor shaft 301, a spur gear 31 sleeved fixedly on the motor shaft 301, and two motors 12 that are disposed on the frame 13, that are adjacent respectively to the driving wheels 11', and that are connected to the wheel-controlling switch 22. When the rotation-controlling switch 21 is pressed downwardly, the motor shaft 301 starts to rotate. Subsequently, when the rotation-controlling switch 21 is released, the motor shaft 301 stops. When the seat member 20 is disposed at the frontward position, the wheel-controlling switch 22 is operable to rotate the driving wheels 11' relative to the frame 13 in a predetermined direction.

The worm unit 40 includes a horizontal worm rod 40' journalled on the frame 13, and a spur gear 41 sleeved fixedly on the worm rod 40'. The timing belt 90 has a toothed inner surface, and is trained on the spur gears 31, 41 of the motor shaft 301 and the worm rod 40' so as to transfer rotation of the motor shaft 301 to the worm rod 40'.

The horizontal mounting plate 50 is connected fixedly to the frame 13 by the bolts 1 and the nuts 2, and is formed with a circular hole 51 therethrough. The battery cases 3 are fixed on the horizontal mounting plate 50. The driving motor 30' and the worm unit 40 are disposed between the horizontal mounting plate 50 and the frame 13.

The rotating shaft 60 extends through the circular hole 51 in the horizontal mounting plate 50, and is journalled on the horizontal mounting plate 50 by two bearings 65, 66 and a bearing seat 67. An outward flange 601 extends integrally, radially, and outwardly from the rotating shaft 60, and abuts against the bearing 65. A worm wheel 68 is sleeved on a lower end portion of the rotating shaft 60, engages the worm rod 40', and is formed with an integral annular flange 680. A positioning pin 69 extends through a hole 681 in the annular flange 680 of the worm wheel 68 and a hole 602 in the rotating shaft 60 so as to fix the worm wheel 68 relative to the rotating shaft 60. As such, the rotation of the worm rod 40' can be transferred to the rotating shaft 60 such that the rotating shaft 60 rotates at a speed slower than that of the worm rod 40'. Thus, the rotation-controlling switch 21 can be actuated to rotate the rotating shaft 60 and the seat member 20 relative to the frame 13 by any desired angle smaller than and equal to 360°, after which the rotation-controlling switch 21 can be released to stop rotation of the rotating shaft 60 and the seat member 20 relative to the frame 13.

The control unit 70 includes a sensing unit and a stop unit. The sensing unit includes a movable sensor 71 and a fixed sensor 72. The stop unit includes a radial projecting rod 73 and a stop element or low L-shaped plate 74. The movable sensor 71 is fixed on one of two C-shaped clamping plates 75 that are interconnected threadedly and that clamp the rotating shaft 60 therebetween so that the movable sensor 71 is attached fixedly to the rotating shaft 60. The fixed sensor 72 is connected threadedly to an upper end of a high L-shaped plate 76 that is connected fixedly to the horizontal mounting plate 50. A plurality of electrical wires (not shown) are disposed among the movable sensor 71, the fixed sensor 72, the motor unit 30, the rotation-controlling switch 21, and the wheel-controlling switch 22. The radial projecting rod 73 is welded to and extends radially and outwardly from the rotating shaft 60. The stop element 74 is connected threadedly to the horizontal mounting plate 50.

When the seat member 20 is disposed at the frontward position shown in FIG. 2, the wheel-controlling switch 22 can be actuated to rotate the driving wheels 11' in the predetermined direction, as described hereinbefore.

The movable sensor 71 can cooperate with the fixed sensor 72 to sense 180° rotation of the rotating shaft 60 so as to reverse the rotational direction of the driving wheels 11' under an automatic control, thereby permitting rotation of the driving wheels 11' relative to the frame 13 in a direction opposite to the predetermined direction. In particular, when it is desired to move the wheelchair rearwardly, the rotation-controlling switch 21 can be operated to rotate the seat member 20 from the frontward position to a rearward position shown by phantom lines in FIG. 4, where the movable sensor 71 is brought into alignment with the fixed sensor 72, as shown by the phantom lines in FIG. 5, and where the wheel-controlling switch 22 can be actuated to rotate the driving wheels 11' in the direction opposite to the predetermined direction. As such, forward and rearward movement of the wheelchair can be conducted with ease. Thus, the object of this invention can be achieved.

Figure 5:
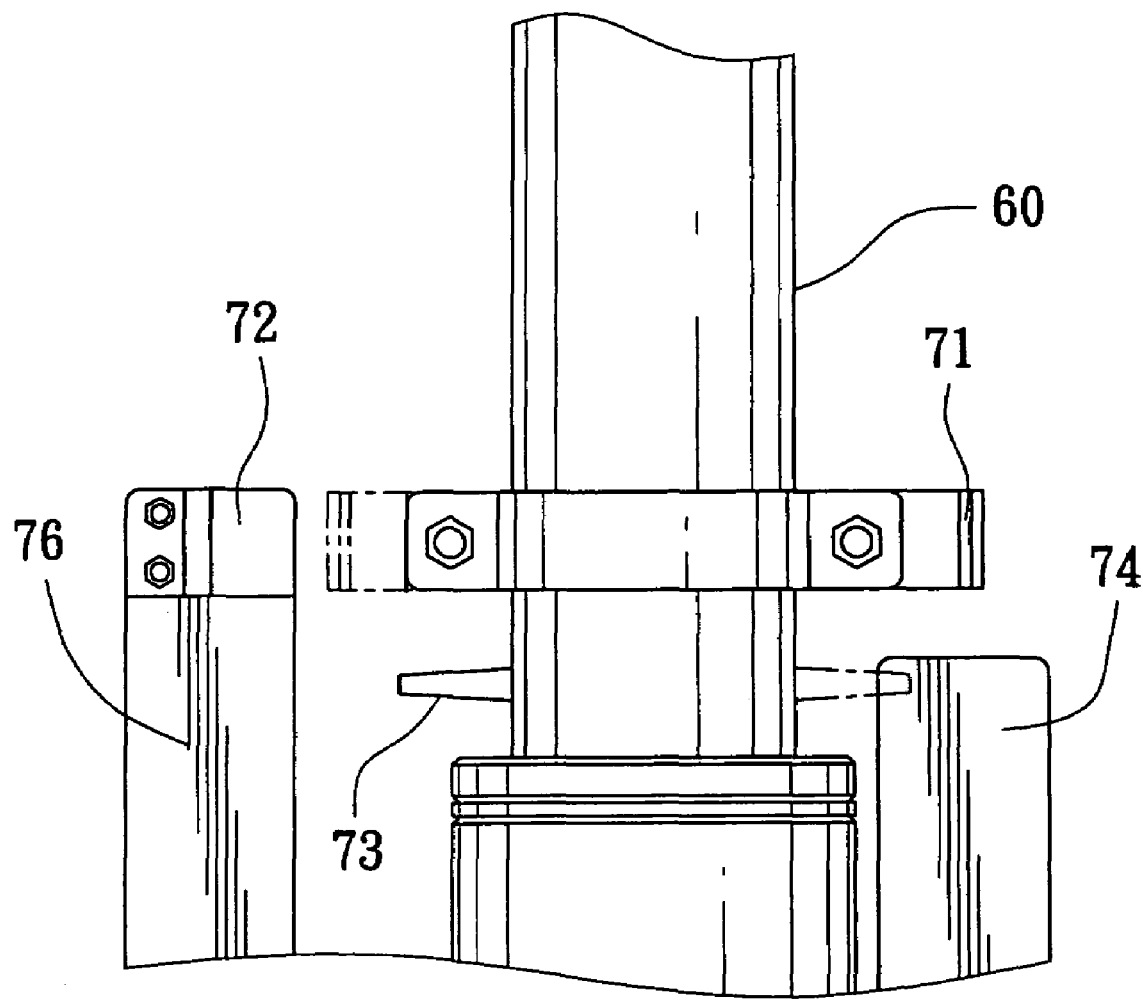
FIG. 5 is a side view of a rotating shaft and a control unit of the preferred embodiment.

When the seat member 20 rotates from the frontward position by 360°, the radial projecting rod 73 contacts the stop element 74, as shown by phantom lines in FIG. 5, so as to prevent further rotation of the rotating shaft 60 and the seat member 20. At this time, the driving motor 30' is stopped due to overload. Under the automatic control, contact between the radial projecting rod 73 and the stop element 74 will cause the rotational direction of the rotating shaft 60 to be reversed so as to prevent cluttering of the electrical wires (not shown) within the rotating shaft 60 when the rotation-controlling switch 21 is actuated once again to rotate the rotating shaft 60 relative to the frame 13.

The control unit 70 can sense rotation of the rotating shaft 60 so as to stop rotation of the driving wheels 11'. Thus, under automatic control, when the seat member 20 rotates relative to the frame 13, the driving wheels 11' cannot be driven so as to provide enhanced safety to the disabled user.

With this invention thus explained, it is apparent that numerous modifications and variations can be made without departing from the scope and spirit of this invention. It is therefore intended that this invention be limited only as indicated by the appended claims.

We claim:

1. An electrical wheelchair comprising:
   a chair body including a frame and a driving wheel unit disposed rotatably on said frame;
   a seat member disposed above said frame and including a rotation-controlling switch and a wheel-controlling switch that are disposed on said seat member, said seat member being disposed at a frontward position relative to said frame;
   a motor unit disposed on said frame and connected electrically to said rotation-controlling switch and said wheel-controlling switch, said wheel-controlling switch being operable to rotate said driving wheel unit relative to said frame in a predetermined direction when said seat member is disposed at said frontward position, said motor unit including a driving motor that is provided with a motor shaft;
   a worm unit including a horizontal worm rod that is journalled on said frame and that is rotated by said motor shaft of said motor unit;
   a vertical rotating shaft journalled on said frame and having an upper end connected fixedly to said seat member;
   a worm wheel engaging said worm rod and sleeved fixedly on said rotating shaft so as to transfer rotation of said worm rod to said rotating shaft, thereby permitting 360° rotation of said rotating shaft and said seat member relative to said frame, said rotation-controlling switch being operable to start and stop rotation of said motor shaft relative to said frame; and
   a control unit including a sensing unit that senses 180° rotation of said rotating shaft so as to reverse rotational direction of said driving wheel unit so that said driving wheel unit can rotate relative to said frame in a direction opposite to said predetermined direction under automatic control, and a stop unit that stops rotation of said rotating shaft relative to said frame when said seat member rotates from said frontward position by 360°, after which rotational direction of said rotating shaft is reversed under automatic control when said rotation-controlling switch is actuated once again, said control unit sensing rotation of said rotating shaft so as to stop rotation of said driving wheel unit.

2. The electrical wheelchair as claimed in claim 1, wherein said worm rod is provided with a spur gear sleeved fixedly thereon, said motor shaft being provided with a spur gear sleeved fixedly thereon, said electrical wheelchair further including an endless timing belt that has a toothed inner surface and that is trained on said gears of said worm rod and said rotating shaft so as to transfer rotation of said motor shaft to said worm rod.

3. The electrical wheelchair as claimed in claim 1, wherein said sensing unit of said control unit includes a movable sensor attached to said rotating shaft, and a fixed sensor disposed fixedly on said frame, said movable sensor being brought into alignment with said fixed sensor so as to reverse the rotational direction of said driving wheel unit when said seat member rotates from said frontward position by 180°.

4. The electrical wheelchair as claimed in claim 3, wherein said stop unit of said control unit includes a radial projecting rod welded to and extending radially and outwardly from said rotating shaft, and a stop element fixed on said frame, said radial projecting rod contacting said stop element so as to prevent further rotation of said rotating shaft relative to said frame when said seat member rotates from said frontward position by 360°, contact between said radial projecting rod and said stop element causing the rotational direction of said rotating shaft to be reversed when said rotation-controlling switch is actuated once again to rotate said rotating shaft relative to said frame.

* * * * *